A. F. RICK.
Coolers for Beer.
No. 138,195. Patented April 22, 1873.
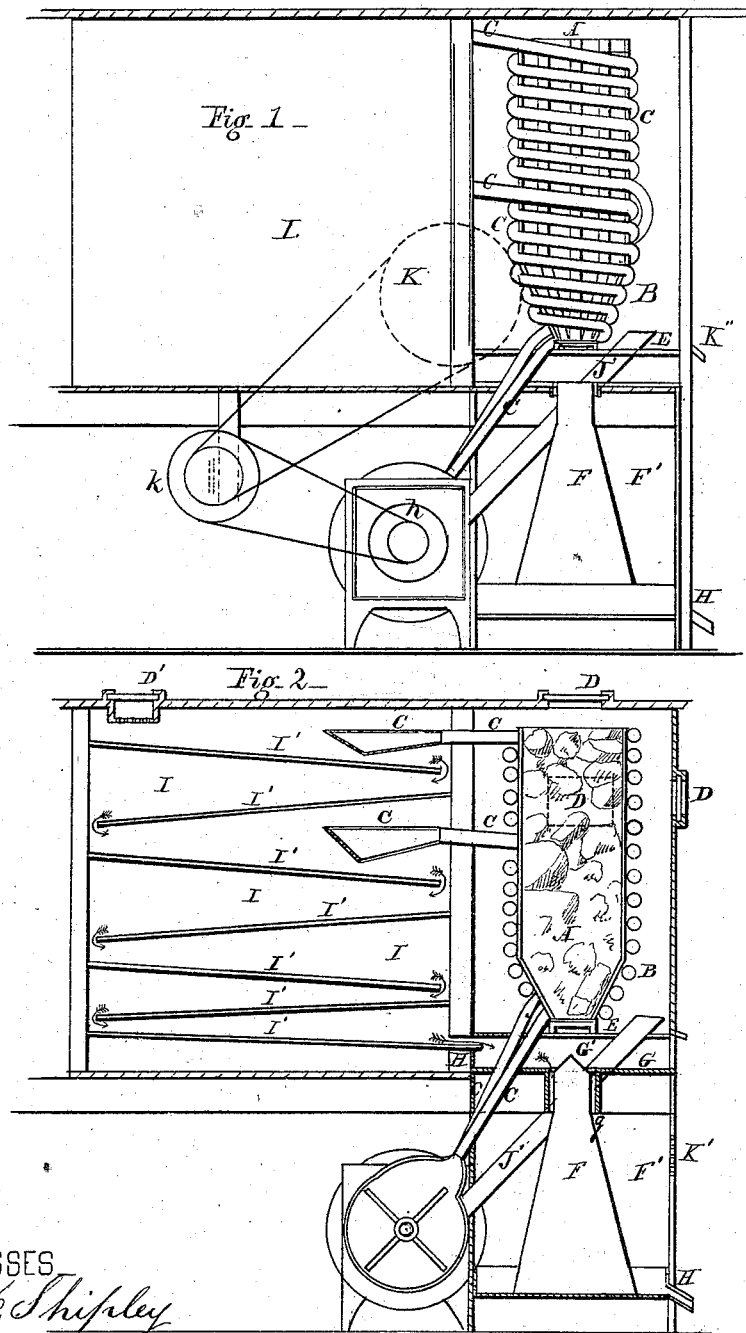
WITNESSES
C. J. Shipley
S. M. Millard
INVENTOR
August F. Rick
By Lidley & Warner
his Attys

UNITED STATES PATENT OFFICE.

AUGUST F. RICK, OF CHICAGO, ILLINOIS.

IMPROVEMENT IN COOLERS FOR BEER.

Specification forming part of Letters Patent No. 138,195, dated April 22, 1873; application filed February 21, 1873.

*To all whom it may concern:*

Be it known that I, AUGUST F. RICK, of Chicago, in the county of Cook and State of Illinois, have invented a new, useful, and Improved Cooler for Cooling Beer, and for other purposes, of which invention the following is a full, clear, and exact description, which will enable others skilled in the art to which my invention appertains to make and use the same, reference being had to the accompanying drawing forming a part hereof, and in which—

Figure 1 represents a side elevation of my cooling apparatus, and Fig. 2 a vertical central section of the same.

Like letters of reference indicate like parts.

My invention relates to that class of coolers employed for the purpose of cooling beer, and for similar purposes; and consists in certain novel features hereinafter particularly described and set forth.

In the drawing, A represents the ice-receptacle, and B is the chamber in which it is arranged. C C are pipes coiled about the receptacle A, which consists, preferably, of vertical bars, arranged so that a considerable space will exist between them, and thus allow the water from the melting ice to flow away and admit of the pipes C C being brought in contact, or nearly in contact, with the ice; but any construction of the receptacle A which admits of this drainage and contact may be allowed. D D are doors in the chamber B, and E is the floor of the said chamber. F is a "steeple," and F' is a chamber in which it is arranged. G is a floor through which the steeple F projects, and G' is a chamber arranged above the chamber F'. The chambers F' and G' communicate with each other by means of the annular space $g$, which surrounds the apex of the steeple, as shown in Fig. 2. H is a drip-pipe, by means of which the liquid contents of the chamber F' are drained away. I is a chamber provided with a series of partitions or diaphragms, I', which are inclined, as shown in Fig. 2. The compartments into which the partitions I' divide the chamber I communicate with each other in the manner indicated by the arrows shown in Fig. 2. D' is a door in the chamber I, and H' is a pipe for the purpose of conducting the liquid contents of the chamber I into the chamber G'. J is a blower, by means of which air is forced into the pipes C C, which communicate with the blower and with the chamber I, as shown. I deem it preferable to conduct the air into the blower through a pipe communicating with the chamber B, as shown at J'.

The blower may be operated by a series of belt-wheels, as shown at K in Fig. 1, or by means of a cord and weight, or in any suitable manner.

The beer or other liquid to be cooled is poured into the apparatus at the door D', and it flows over the floors I', passing from one to the other, as indicated by the arrows shown in Fig. 2, until it reaches the eduction H'; from thence it passes into the chamber G' and falls upon the steeple F and passes from the chamber F' through the eduction H into any suitable receptacle.

It will be observed that the liquid is thus spread out into a shallow sheet while it is passing through the apparatus.

The action of the blower draws the air into the chamber B. The air is there cooled to some extent by means of the ice in the receptacle A and by the cold water in the chamber E. The air then enters the blower and is expelled from thence into the pipes C C, where it is cooled to a still greater extent. The cold air is then discharged from the pipes C C into the chamber I, and being thus brought into contact with the liquid, the latter is rendered cool.

The air which is drawn into the apparatus, after having been thus cooled and brought into contact with the beer or other liquid, escapes through the perforations K'.

The water which accumulates in the chamber B may be drawn off through the pipe or opening K''.

Any of the parts which operate together may be arranged in any suitable or convenient place, provided they are connected with each other, substantially as described.

Having thus described my invention, what I claim as new, and desire to secure by Letters Patent, is—

In combination, the chamber B provided with an ice-receptacle; the chamber I provided with one or more inclined floors; the pipes C C arranged substantially as described; a blower and a "steeple," all operating together, substantially as and for the purposes specified.

AUGUST F. RICK.

Witnesses:
N. C. GRIDLEY,
F. F. WARNER.